(12) United States Patent
Hunag et al.

(10) Patent No.: US 8,311,862 B2
(45) Date of Patent: Nov. 13, 2012

(54) ORGANIZATIONAL DESIGN APPROACH TO TRANSITION COST ASSESSMENT FOR BUSINESS TRANSFORMATION

(75) Inventors: Jinchao Hunag, Markham (CA); John W. Sweitzer, Austin, TX (US); Yi-Hsiu Wei, Austin, TX (US); Kamorudeen Larry Yusuf, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1247 days.

(21) Appl. No.: 11/846,603

(22) Filed: Aug. 29, 2007

(65) Prior Publication Data

US 2009/0063210 A1     Mar. 5, 2009

(51) Int. Cl.
 *G06Q 10/00* (2012.01)
(52) U.S. Cl. ...................................... 705/7.11; 705/7.36
(58) Field of Classification Search .................. 705/7.11, 705/7.36
 See application file for complete search history.

(56) References Cited

U.S. PATENT DOCUMENTS

| | | | |
|---|---|---|---|
| 6,816,902 B1* | 11/2004 | Bandat et al. .................. | 709/226 |
| 6,895,382 B1* | 5/2005 | Srinivasan et al. ........... | 705/7.17 |
| 2005/0049911 A1* | 3/2005 | Engelking et al. .............. | 705/11 |
| 2006/0235732 A1* | 10/2006 | Miller et al. ....................... | 705/7 |
| 2008/0255912 A1* | 10/2008 | Christiansen et al. ............ | 705/8 |

OTHER PUBLICATIONS

Eugene Deborin, "Continuous Business Process Management with HOLOSOFX BPM Suite and IBM MQSeries Workflow", IBM Redbooks, May 2002.*
Harshavardhan Karandikar, "A model for managing the transition to a global engineering network spanning industrialized and emerging economies", Journal of Manufacturing Technology Management vol. 17 No. 8, 2006, pp. 1042-1057.*
Eugene Deborin, "Continuous Business Process Management with HOLOSOFX BBM Suite and IBM MQSeries Workflow", IBM Redbooks, May 2002.*

* cited by examiner

*Primary Examiner* — Mark A Fleischer
(74) *Attorney, Agent, or Firm* — Cantor Colburn LLP; Libby Toub (57) ABSTRACT

A method for facilitating in assessing transitional costs in business transformations using a computer-aided organizational design system is provided. The method comprises creating a first organization design model representative of the current organizational design state of an organization using a graphical tool. The method further comprises changing the first organization design model into a second organization design model representative of the organizational design state of the organization after the business transformation. The method further comprises generating a report identifying the transition cost factors and the transition cost of moving from the first organization design model to the second organization design model, wherein the transition cost is determined based on predetermined calculation algorithms or heuristics.

6 Claims, 7 Drawing Sheets

| ROLE DEFINED IN ORGANIZATION | ROLE CHANGE AFTER TRANSITION | TRANSITION COST FACTOR | TRANSITION ESTIMATE (BY PERSON) |
|---|---|---|---|
| ROLE A | TASK 2 ADDED, TASK 2 OUTPUT TO BE PASSED TO TASK 3 | TOOL Y SKILL LEVEL 1 REQUIRED, ROLE A AND C COLLABORATION REQUIRED | TRAINING +$$$ AND nnn DAYS, COLLABORATION SOFTWARE +$$$ |
| ROLE B | ROLE REMOVED | | RESOURCE SAVING -$$$ |
| ROLE C | TOOL Z REMOVED, TOOL W ADDED | TOOL Z LICENSE RETURNED, TOOL W LICENSE REQUIRED, TOOL W SKILL LEVEL 1 REQUIRED | TOOL Z LICENSE RETURNED -$$$ TOOL W LICENSE +$$$ TRAINING +$$$ AND n DAYS |

*FIG. 5*

| # | Change Record | Version | Potential Cost Factors |
|---|---|---|---|
| | Webmaster | | |
| 1 | create this role | open | skills, human interactions |
| 2 | set new role name Webmaster | open | n/a |
| 3 | transfer in task Publish Product Material from role Product Author | open | skills, human interactions |
| | Product Data Manager | | |
| 1 | imported from SBP | out-of-box | n/a |
| | Graphic Designer | | |
| 1 | imported from SBP | out-of-box | n/a |
| | Pricing Analyst | | |
| 1 | imported from SBP | out-of-box | n/a |
| 2 | remove task Find Product | open | n/a |
| 3 | remove task View Product Item | open | n/a |
| 4 | remove task Augment Product Item with Merchandising Data | open | n/a |
| 5 | remove this role | open | n/a |
| | Marketing Analyst | | |
| 1 | imported from SBP | out-of-box | n/a |
| 2 | combine with role Pricing Analyst | open | skills, human interactions |
| 3 | create task Find Product | open | n/a |
| 4 | create task View Product Item | open | n/a |
| 5 | create task Augment Product Item with Merchandising Data | open | n/a |
| 6 | set role name Marketing Analyst and Pricing Analyst | open | n/a |
| 7 | set role name Sales Manager | open | n/a |
| | Product Author | | |
| 1 | imported from SBP | out-of-box | n/a |
| 2 | transfer out task Publish Product Material | open | skills, human interactions |

ORGANIZATIONAL DESIGN APPROACH TO TRANSITION COST ASSESSMENT FOR BUSINESS TRANSFORMATION

BACKGROUND OF THE INVENTION

1. Field of the Invention

This invention relates to a computer-aided organizational design system, and particularly to a method for facilitating in assessing transitional costs in business transformations.

2. Description of Background

Organizations undertaking business transformation evolve from one organization state to another. Costs incurred during the transitions, if not properly managed, can offset the financial benefits gained or even fail the business transformation. One significant cost factor is staffing and skill requirements. This is due to the fact that transitions often lead to retraining staff, recruiting new skills, acquiring software for collaboration, etc. To ensure the financial benefits and return of investment, organizations need to estimate the transition costs in people dimension before embarking on business transformation. Software providers also need to assess the transition costs in client organizations in order to deliver solutions that enable the clients to complete the business transformation.

Methods or solutions have been considered in measuring the transition costs in such business transformations. For example, Business Process Management (BPM) emerged as a discipline when organizations were focused on business process management and improvement. There are BPM processes and tools that measure the impacts of process changes on process outcomes, system performance, resource utilization, etc., but give little consideration for how staff members will be affected in terms of the changes in skill requirements, people collaboration, task assignments, etc. As a result, these methods or solutions overlook this significant 'hidden cost' and cannot guarantee the business will get the desired value after the transformations.

SUMMARY OF THE INVENTION

The shortcomings of the prior art are overcome and additional advantages are provided through the provision of a method for facilitating in assessing transitional costs in business transformations using a computer-aided organizational design system, the method comprising: creating a first organization design model representative of the current organizational design state of an organization using a graphical tool identifying a first plurality of roles and the relationships among the first plurality of roles with respect to each other and at least one of a first plurality of tasks respectively designated to each of the first plurality of roles, each of the first plurality of tasks having at least one of a first plurality of tools is configured to correspondingly perform one of the first plurality of tasks; changing the first plurality of roles in the first organization design model to a second plurality of roles by adding another role, combining or splitting one or more of the first plurality of roles, or both, in the first organization design model and changing the first plurality of tasks to a second plurality of tasks by designating another task, combining or splitting one or more of the first plurality of tasks, or both in the first organization design model forming a second organization design model, one or more of the second plurality of tasks is correspondingly designated to one of the second plurality of roles; and generating a report identifying at least one of a second plurality of tools having a skill level necessary for each of the second plurality of roles to correspondingly perform one or more of the second plurality of tasks designated for each of the second plurality of roles, identifying the relationships among the second plurality of roles, and identifying a transition cost for each of the second plurality of roles when moving from the first organization design model to the second organization design model, the transition cost is determined based on predetermined calculation algorithms or heuristics.

The shortcomings of the prior art are overcome and additional advantages are provided through the provision of a computer-aided organizational design system for facilitating in assessing transitional costs in business transformations, the system comprising: a computer readable medium having a computer program configured to create a first organization design model representative of the current organizational design state of an organization using a graphical tool identifying a first plurality of roles and the relationships among the first plurality of roles with respect to each other and at least one of a first plurality of tasks respectively designated to each of the first plurality of roles, each of the first plurality of tasks having at least one of a first plurality of tools is configured to correspondingly perform one of the first plurality of tasks; change the first plurality of roles in the first organization design model to a second plurality of roles by adding another role, combining or splitting one or more of the first plurality of roles, or both, in the first organization design model and changing the first plurality of tasks to a second plurality of tasks by designating another task, eliminating one or more of the first plurality of tasks, or both in the first organization design model forming a second organization design model, one or more of the second plurality of tasks is correspondingly designated to one of the second plurality of roles; and generate a report identifying at least one of a second plurality of tools having a skill level necessary for each of the second plurality of roles to correspondingly perform one or more of the second plurality of tasks designated for each of the second plurality of roles, identifying the relationships among the second plurality of roles, and identifying a transition cost for each of the second plurality of roles when moving from the first organization design model to the second organization design model, the transition cost is determined based on predetermined calculation algorithms or heuristics.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for facilitating in assessing transitional costs in business transformations using a computer-aided organizational design system.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments of a computer-aided organizational design system and a method of using the same in accordance with the present invention will now be described with reference to the drawings. The exemplary embodiment of a computer-aided organization design system described herein is configured to create a first organization design model representative of the current state of an organization using a graphical tool identifying a first plurality of roles and the relationships among the first plurality of roles with respect to each other and at least one of a first plurality of tasks respectively designated to each of the first plurality of roles, where each of the first plurality of tasks having at least one of a first plurality of tools is configured to correspondingly perform one of the first plurality of tasks. The exemplary embodiment of a computer-aided organizational design system described herein is further configured to change the first plurality of roles in the first organization design model to a second plurality of roles by adding another role, eliminating one or more of the first plurality of roles, or both, in the first organization design model and changing the first plurality of tasks to a second plurality of tasks by designating another task, combining or splitting one or more of the first plurality of tasks, or both in the first organization design model forming a second organization design model, where one or more of the second plurality of tasks is correspondingly designated to one of the second plurality of roles. The exemplary embodiment of a computer-aided organizational design system described herein is further configured to generate a report identifying at least one of a second plurality of tools having a skill level necessary for each of the second plurality of roles to correspondingly perform one or more of the second plurality of tasks designated for each of the second plurality of roles, identifying the relationships among the second plurality of roles, and identifying a transition cost for each of the second plurality of roles when moving from the first organization design model to the second organization design model, the transition cost is determined based on predetermined calculation algorithms or heuristics.

The inventors herein have recognized that in business transformation an organization changes its organizational design continuously. The changes can happen at different levels and in various aspects within the organization. The changes with the largest impacts on the people working in the organization are those related to user roles and tasks. For example, an organization change may lead to elimination of roles, combination of roles, and task (responsibilities) transfer across roles. The inventors herein have further recognized that changing an organizational design from one state to another may require more or less software tools and licenses, training people to acquire the right skills and skill levels, and additional communication setup for the desired collaboration between people. As such, the inventors herein have recognized that having a computer-aided organizational design system that uses an organization design model to capture organization designs and the successive organizational design changes facilitates in assessing transitional costs in business transformations, which will described in more detail below.

Figure 1:
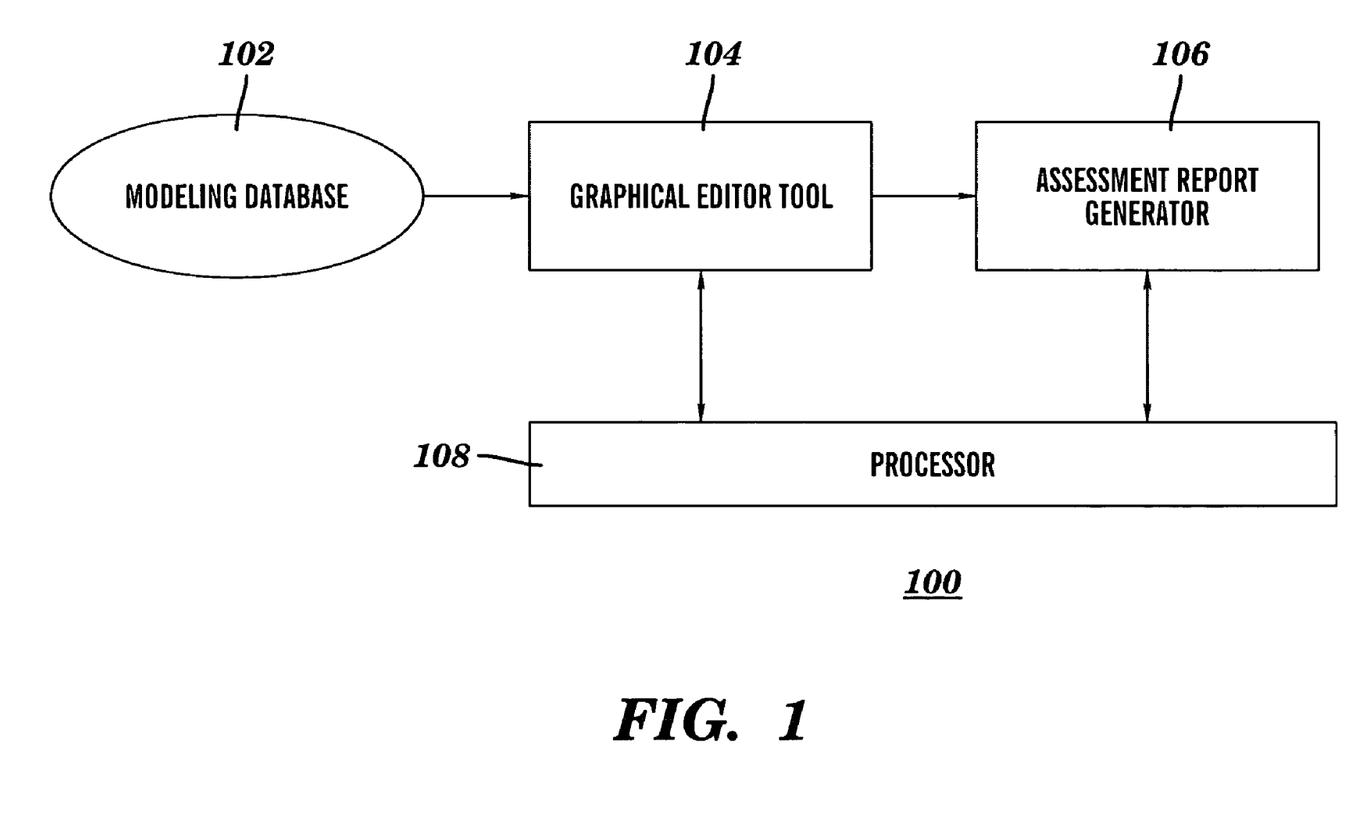
FIG. 1 illustrates a design flow diagram of a computer-aided organizational design system in accordance with one exemplary embodiment of the present invention.

FIG. 1 is a design flow diagram of a computer-aided organizational design system 100 for automated object modeling according to one embodiment of the present invention. The system 100 includes a design modeling database 102, a graphical editor tool 104, an assessment report generator 106, and a processor 108. In one exemplary embodiment, processor 108 is a conventional computer system configured for a user (e.g., a project manager within the organization) to operate, access modeling database 102, create organization design models representing the state of a client organization both before and after a business transformation or transition by using graphical editor tool 104 and view the same via a display screen (not shown) of the processor 108, and view assessment reports generated by assessment report generator 106.

In accordance with one embodiment, the design-modeling database 102 includes several tools for object modeling the organization design state of an organization or business. Generally speaking, modeling database 102 is a conventional organization-modeling database for use in graphically illustrating the state of an organization. In one embodiment, the design-modeling database 102 includes various graphical objects for modeling and representing the state of an organization. In one embodiment, the design-modeling database 102 includes a set of conventional building objects for graphically representing the state of an organization through an organization design model using graphical editor tool 104 in accordance with one embodiment.

In accordance with one exemplary embodiment, graphical editor tool 104 is configured to create an organization design model representative of the state of an organization. A user creates an organization design model to show various aspects in an organization using object modeling. In one non-limiting embodiment, the system 100 is configured to create an organization design model using a standardized specification language for object modeling, such as Unified Modeling Language (UML).

Figure 2:
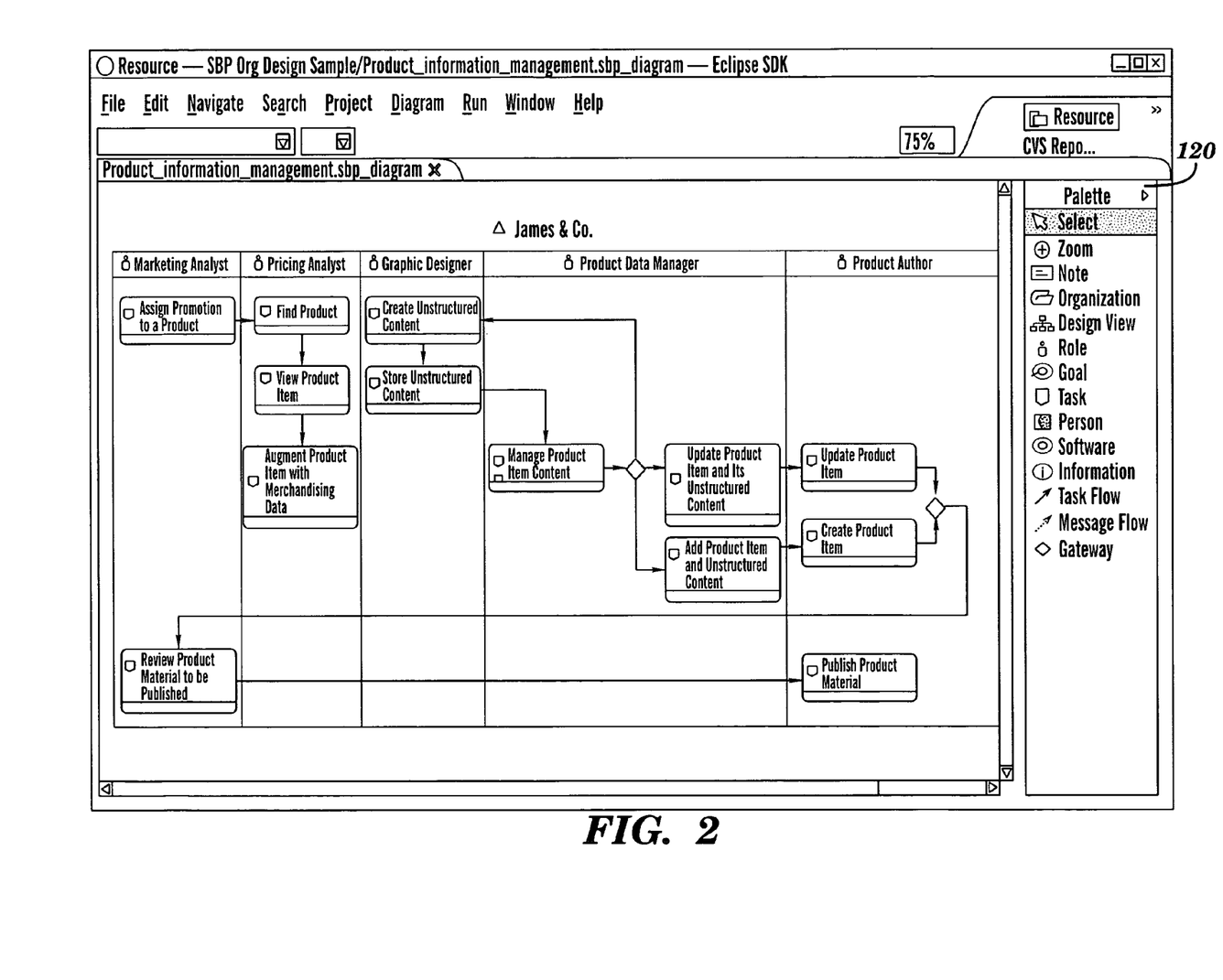
FIG. 2 is an exemplary screen shot of an organization design model in accordance with one embodiment of the present invention.

An exemplary screen shot of an organization design model using graphical editor tool 104 in accordance with one embodiment of the present invention is illustrated in FIG. 2. As shown in this exemplary screen shot, graphical editor tool 104 includes a palette feature 120 for creating the organization design model. The palette feature 120 includes modeling features supplied from the design-modeling database 102 for creating user roles, tasks, and tools used to perform the tasks, which together may represent the state of the organization. The user roles, tasks, and tools (responsibilities) are sufficiently augmented with required skills and skill levels. As such, changing the user roles, tasks, and tools reveals the kind of skills and skill levels that are required or not required after the organizational change. Similarly, the change information from role-to-role and task-to-task relations will reveal what kinds of people collaboration are required after the transition, which leads to the understanding of what tools (e.g., software tools) are appropriate for communication and collaboration. The user may create an organization design model before and after a business transformation.

When creating the organization design model before the business transformation using graphical editor tool 104, the user may select the various user roles representative of the current roles in the organization (e.g., marketing analyst, pricing analyst, etc.) and one or more tasks designated for each of the selected user roles. The tasks are representative of the responsibilities held for each user role. For example, a user role being a pricing analyst for the organization is designated the task of viewing the product item as shown in the model diagram in FIG. 2. Each of the tasks selected by the user has one or more associated tools (e.g., software tool) necessary for performing the corresponding tasks. For example, in order for a pricing analyst to view product items, a software program for viewing the product items needs to be available to the person assigned to the user role. In one embodiment, each of the associated tools is considered a skill to perform the corresponding tasks that has an associated skill level for proficiently using or implementing the associated tool. For example, using the example above, the pricing analyst (user role) needing to use the software program (tool) to view product items (task) needs to have a sufficient skill level to use the software program in a manner commensurate with the organization. The user may also show the relationships among the roles in the organization by using a feature of the graphical editor tool, such as a task flow arrow as shown.

With the graphical editor tool 104, the user may change the organization design model view to simulate the transition the organization will go through. In one non-limiting embodiment, the user customizes the organization design model using a drag-and-drop operation to change the user roles, tasks, and their relationships with one another. For example, an object box representing the task of viewing product items designated to the pricing analyst can be dragged under a different user role, such as the marketing analyst. In one embodiment, the relationship or task flow is updated automatically once the user customizes the organization design model. In one embodiment, the system 100 automates the correlation of the changes in user roles, tasks, and tools, together with the changes in skills, skill levels, and collaboration needs. In other words, the system 100 shows the potential impact of the transition on the staff in the organization once the user customizes the organization design model of FIG. 2.

Figure 3:
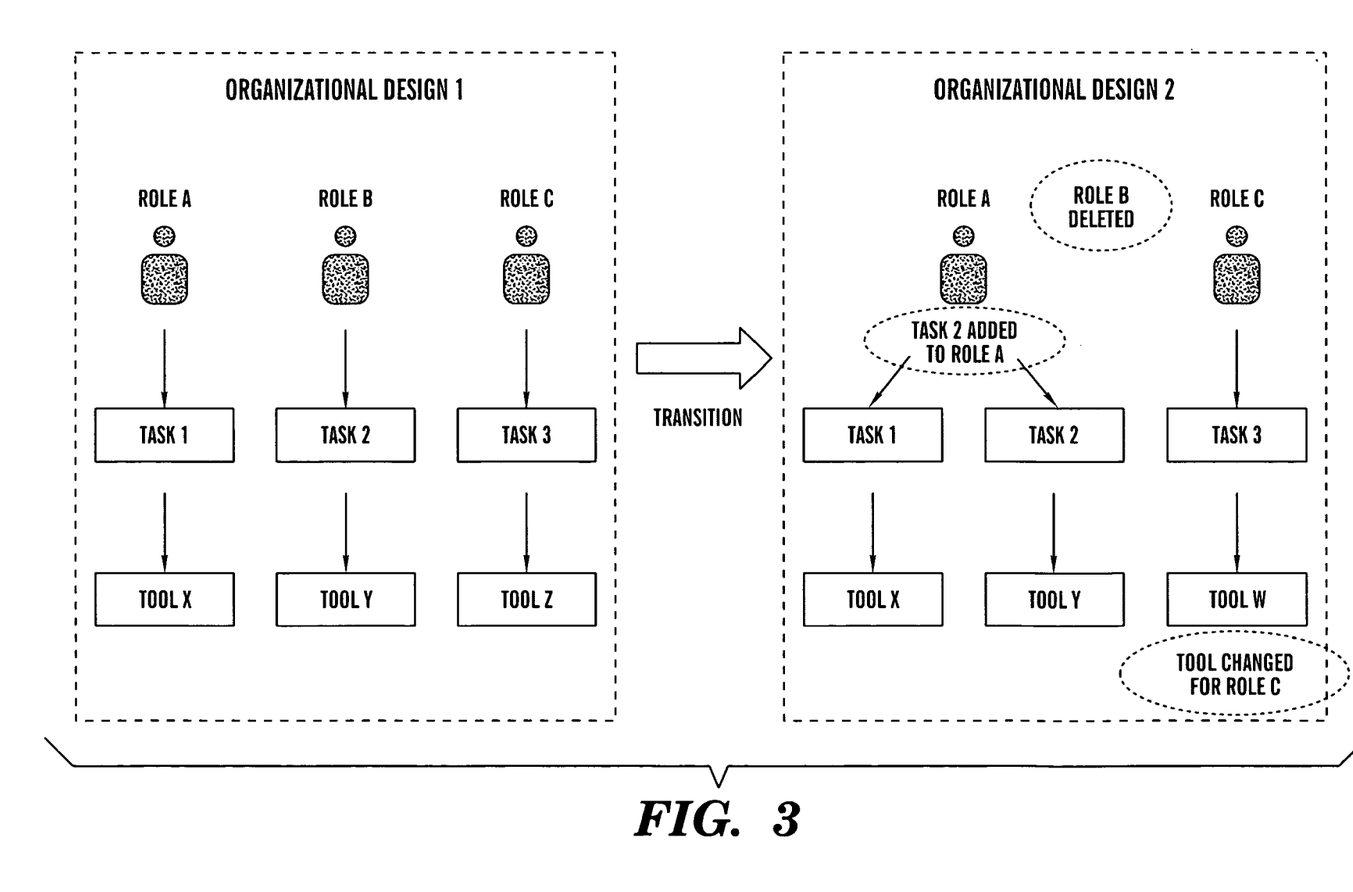
FIG. 3 is an exemplary diagram of a first organization design model representative of the organization design state of an organization before a business transition on the left-hand side of the exemplary diagram and of a second organization design model representative of the state of the organization after the business transition on the right-hand side of the exemplary diagram in accordance with one exemplary embodiment of the present invention.
Figure 4:
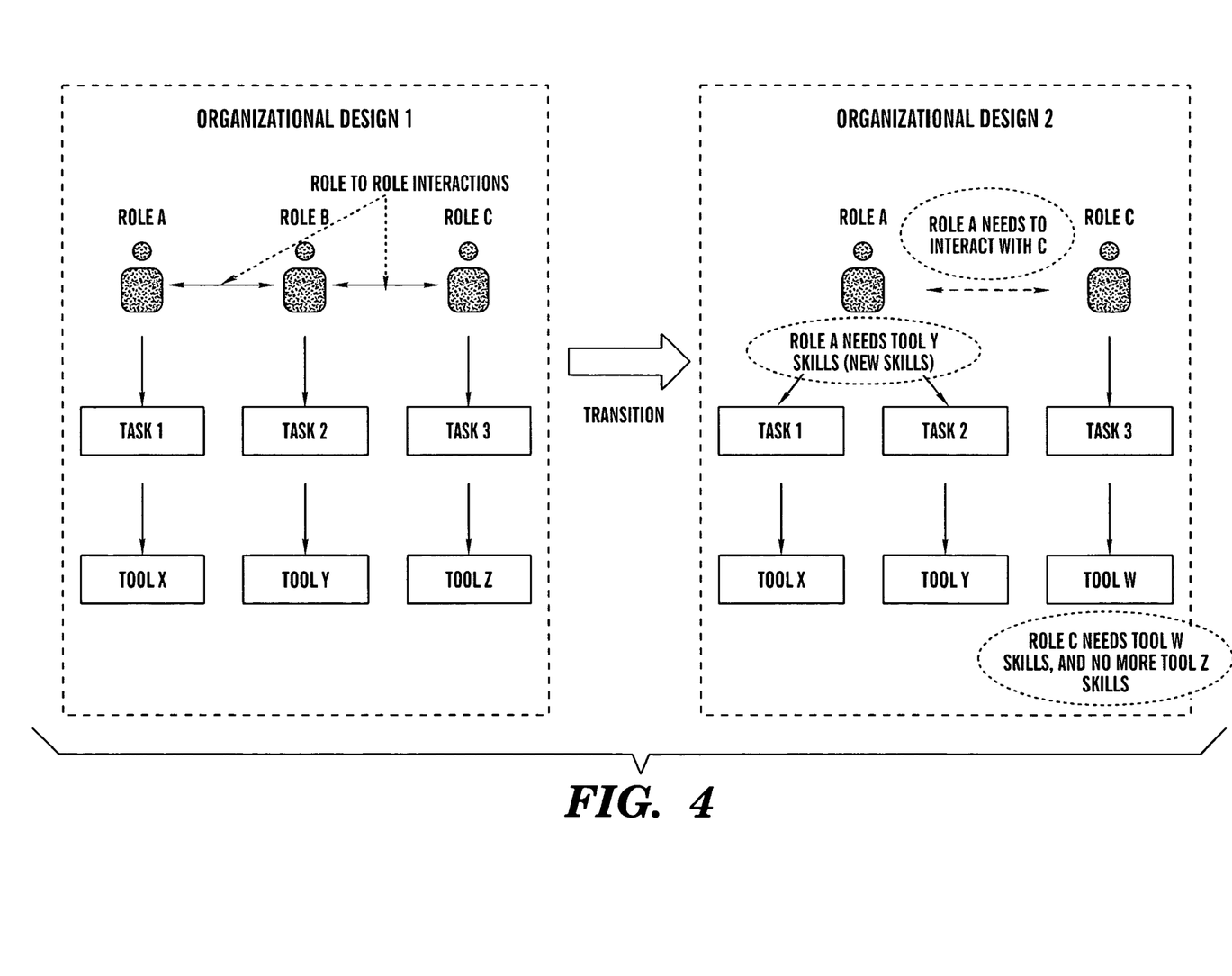
FIG. 4 is an exemplary diagram of the first organization design model representative of the organization design state of the organization before the business transition on the left-hand side of the exemplary diagram and of the second organization design model representative of the organization design state of the organization after the business transition on the right-hand side of the exemplary diagram in accordance with one exemplary embodiment of the present invention.

Now referring to FIGS. 3 and 4 an exemplary diagram of an organizational design model representative of the state of the organization before and after the business transition is illustrated using simplified objects in accordance with one exemplary embodiment of the present invention. For simplistic purposes, the organization design model shown in FIG. 3 does not specify the specific user role, task, or tool; however, can be any specific role, task, or tool representative of the organization design state of the organization. Furthermore, only one task and one tool is designated to each role; however, it should be understood that more than one task and more than one tool can be designated to each role accordingly based on the organization design of the organization and should not be limited to the configuration as shown. As shown, the user may select various user roles, such as role A, role B, and role C to represent the roles within the organization using object modeling features provided by graphical editor tool 104. The user designates each role a respective task. In this example, task 1, task 2, and task 3 are designated to role A, role B, and role C respectively. The user also designates a tool for performing such task. In one embodiment, the tool is designated automatically by system 100. In this example, tool X, tool Y, and tool Z is designated to task 1, task 2, and task 3 respectively. Consequently, an organization design model before the business transformation is formed and depicted in FIG. 3 as Organizational Design 1. Once the current state of the organization is modeled, the user may make changes to the roles and tasks to resemble the business transformation. In this example, the user removed role B and has added the task of role B to role A, thereby designating role A to use both tool X and tool Y. The organization design model after the business transformation is formed is depicted in FIG. 3 as Organizational Design 2. The impact of the business transformation on the staff assuming the roles is illustrated in FIG. 4. As a result of the transition, role A and role C need to interact with one another. Role A needs the skills of tool Y to perform task 2 as shown. Consideration needs to be given to facilitate the collaboration between role A and role C. Moreover, tool Z designated for use by role C is eliminated and replaced by tool W. Thus, role C needs to obtain the skills of tool W. In effect, the user may effective visualize the factors for moving the organization from one state to another using graphical editor tool 104.

The user may assign a number of people to each role using graphical editor tool 104. Once a number of people are assigned to each role, a transition cost is calculated based on cost calculation algorithms or heuristics by processor 108 in accordance with one non-limiting embodiment. For example, after the business transition a role may be required to perform a new task, which requires new skills. The cost for providing training and education to the staff members who are assuming the roles and amount of time for those employees to reach to the required proficiency level will contribute to the transition cost. If the organization chooses to hire someone who already possesses the required proficiency level, the recruiting expenses and the new resource cost will be a main factor in the transition cost.

Figure 5:
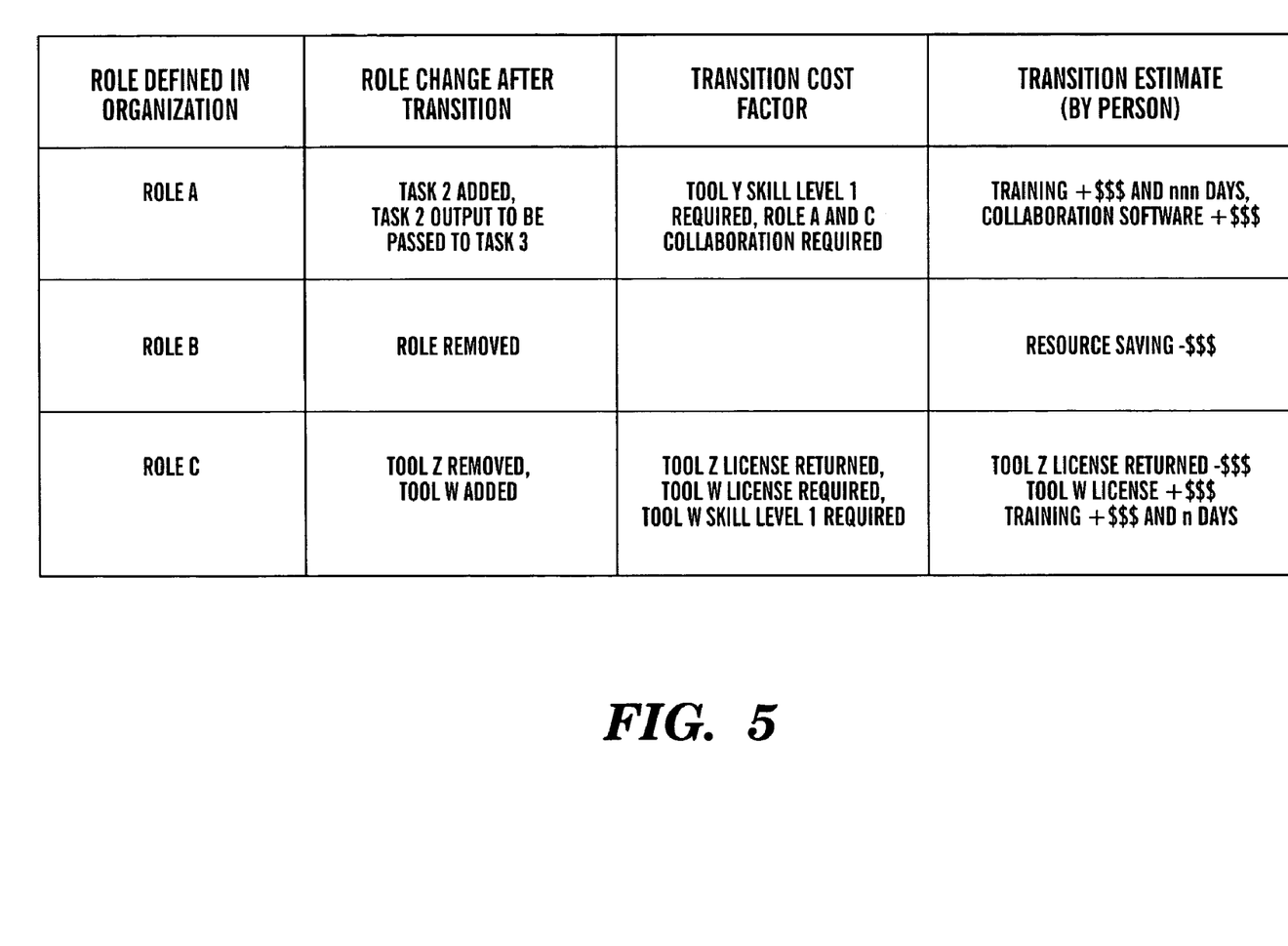
FIG. 5 is an exemplary table of an assessment report in accordance with one exemplary embodiment of the present invention.

In accordance with one embodiment, assessment report generator 106 can generate a report in the form of a table. FIG. 5 illustrates an exemplary table of the assessment report for the transition in FIG. 3, assuming the organization has no new recruits after the transition. Of course, the table shown in FIG. 5 is exemplary in nature and will change depending on the changes made by the user and the current state of the organization. The assessment report comprises the roles defined in the organization, the changes in the roles after the transition, the transition cost factors, and the transition cost or estimate when the transition cost factors are considered. For example, since role A now has been designated task 2, the person assigned to role A now has to acquire the skills to use tool Y (transition cost factor), which will require training for a number of days to reach the proficiency level required to use tool Y (transition estimate or cost).

Figure 6:
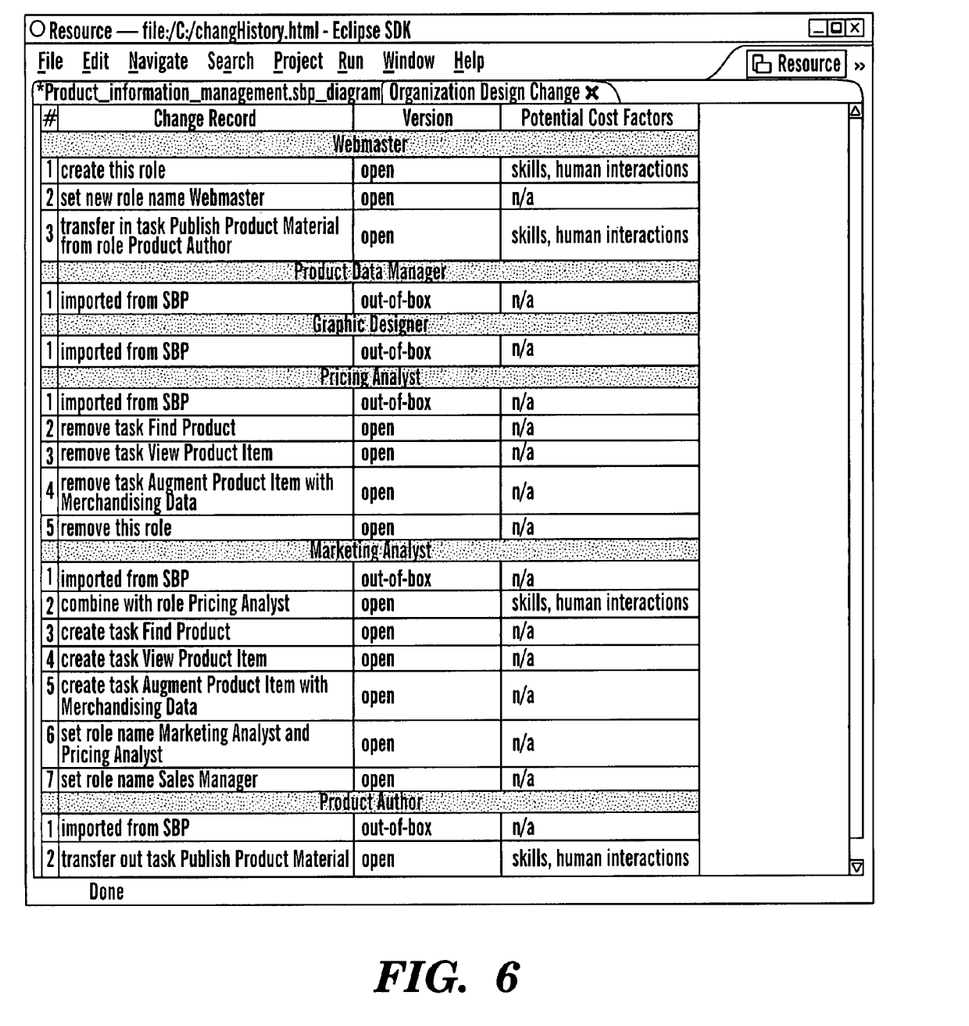
FIG. 6 is an exemplary screen shot of a transition cost factor report in accordance with one exemplary embodiment of the present invention.

In accordance with one embodiment, assessment report generator 106 can generate a separate report illustrating the transition cost factors in the form of a diagram in order for the organization to plan accordingly. FIG. 6 illustrates an exemplary screen shot of a transition cost factor report in accordance with one exemplary embodiment of the present invention. It is contemplated that a report on the transition cost for a particular transition can also be generated in accordance with one embodiment.

Figure 7:
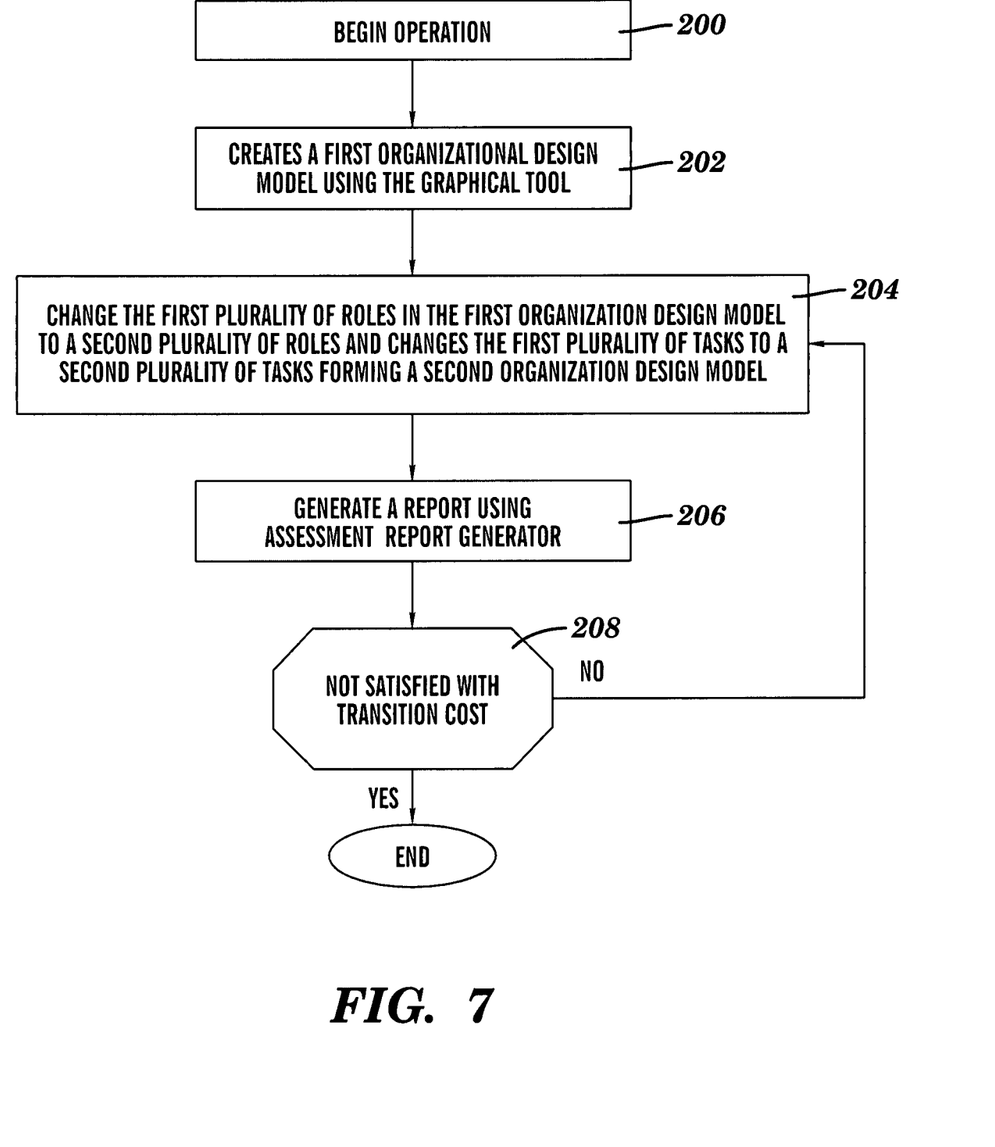
FIG. 7 is a flow-chart diagram that provides a method for facilitating in assessing transitional cost in organizational transformations in accordance with one exemplary embodiment of the present invention.

In accordance with an exemplary embodiment of the present invention, an exemplary method for facilitating in assessing transitional costs in business transformations is provided and illustrated in FIG. 7. In this exemplary method, a user operates the computer-aided organizational design system at block 200. Then, the user creates a first organizational design model using the graphical tool at block 202. The first organization design model is representative of the current organization design state of the organization and identifies a first plurality of roles and the relationships among the first plurality of roles with respect to each other and at least one of a first plurality of tasks respectively designated to each of the first plurality of roles, where each of the first plurality of tasks having at least one of a first plurality of tools is configured to correspondingly perform one of the first plurality of tasks. Next, at block 204, the user changes the first plurality of roles in the first organization design model to a second plurality of roles and changes the first plurality of tasks to a second plurality of tasks forming a second organization design model. This is accomplished by adding another role, eliminating one or more of the first plurality of roles, or both, in the first organization design model and designating another task, combining or splitting one or more of the first plurality of tasks, or both in the first organization design model. In one embodiment, one or more of the second plurality of tasks is correspondingly designated to one of the second plurality of roles. At block 206, generate a report using assessment report generator. The report identifies at least one of a second plurality of tools having a skill level necessary for each of the second plurality of roles to correspondingly perform one or more of the second plurality of tasks designated for each of the second plurality of roles. The report further identifies the relationships among the second plurality of roles. The report further identifies a transition cost for each of the second plurality of roles when moving from the first organization design model to the second organization design model, where the transition cost is determined based on predetermined calculation algorithms or heuristics. If the user is not satisfied with the transition cost at block 208, then the user may further customize the first organization design model either to reduce cost or have more changes or otherwise.

Advantageously, exemplary embodiments of the present invention provides a quick and effective way to visualize the costs or cost factors for moving an organization from one state to another, and, therefore, assist business executives and managers in making decisions for business transformation as well as planning the transitions. Exemplary embodiments of the present invention allow a user to specify role-to-people relations including cardinality. Exemplary embodiments of the present invention advantageously keeps track of the changes and provides a report on the transition cost factors for a particular transition and also a report on the transition costs after consideration of the transition cost factors have been made.

It is contemplated that exemplary embodiments of the present invention can be extended to provide a number of cost calculation algorithms and allow users to provide further inputs to create a fine-grained transition cost report or assessment report of the business transformation.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for facilitating in assessing transitional costs in business transformations using a computer-aided organizational design system, the method comprising:

creating, by a computer processor, a first organization design model representative of a current organization design state of an organization by identifying a first plurality of roles and the relationships among the first plurality of roles with respect to each other and by identifying at least one of a first plurality of tasks respectively designated to each of the first plurality of roles, each of the first plurality of tasks having at least one of a first plurality of tools is configured to correspondingly perform one of the first plurality of tasks;

creating, by the computer processor, a second organization design model representative of a non-current organization design state of the organization by changing the first plurality of roles in the first organization design model to a second plurality of roles by adding another role, combining or splitting one or more of the first plurality of roles, or both, in the first organization design model and by changing the first plurality of tasks to a second plurality of tasks by designating another task, eliminating one or more of the first plurality of tasks, or both in the first organization design model, one or more of the second plurality of tasks is correspondingly designated to one of the second plurality of roles; and generating, by the computer processor, a report in response to a transition from the first organization design model to the second organization design model;

wherein the report includes an identification of at least one of the second plurality of roles having a skill level necessary for each of a second plurality of tools to correspondingly perform one or more of the second plurality of tasks designated for each of the second plurality of roles;

wherein the report includes an identification of the relationships among the second plurality of roles;

wherein the report includes a transition cost for each of the second plurality of roles when moving from the first organization design model to the second organization design model, the transition cost is determined based on predetermined calculation algorithms or heuristics; and wherein the transition cost includes a cost of education required to transition from the first organization design model to the second organization design model, recruiting costs for hiring a skilled resource, a cost of retraining for individuals transitioning from the first organization design model to the second organization design model, and cost of a communication setup to facilitate collaboration between the second plurality of roles.

2. The method as in claim 1, wherein the transition cost further identifies an estimated period of time necessary for each of the second plurality of roles to reach the skill level necessary for each of the second plurality of roles to correspondingly perform one or more of the second plurality of tasks designated for each of the second plurality of roles.

3. The method as in claim 1, wherein the second organization design model is representative of the organization design state of the organization when the first organization design model is customized.

4. A computer-aided organizational design system for facilitating in assessing transitional costs in business transformations, the system comprising:

a computer processor configured to:

create a first organization design model representative of a current organization design state of an organization by identifying a first plurality of roles and the relationships among the first plurality of roles with respect to each other and by identifying at least one of a first plurality of tasks respectively designated to each of the first plurality of roles, each of the first plurality of tasks having at least one of a first plurality of tools is configured to correspondingly perform one of the first plurality of tasks;

create a second organization design model representative of a non-current organization design state of the organization by changing the first plurality of roles in the first organization design model to a second plurality of roles by adding another role, combining or splitting one or more of the first plurality of roles, or both, in the first organization design model and by changing the first plurality of tasks to a second plurality of tasks by designating another task, eliminating one or more of the first plurality of tasks, or both in the first organization design model, one or more of the second plurality of tasks is correspondingly designated to one of the second plurality of roles; and generate a report in response to a transition from the first organization design model to the second organization design model;

wherein the report includes an identification of at least one of the second plurality of roles having a skill level necessary for each of a second plurality of tools to correspondingly perform one or more of the second plurality of tasks designated for each of the second plurality of roles;

wherein the report includes an identification of the relationships among the second plurality of roles;

wherein the report includes an identification of a transition cost for each of the second plurality of roles when moving from the first organization design model to the second organization design model, the transition cost is determined based on predetermined calculation algorithms or heuristics; and wherein the transition cost includes a cost of education required to transition from the first organization design model to the second organization design model, recruiting costs for hiring a skilled resource, a cost of retraining for individuals transitioning from the first organization design model to the second organization design model, and cost of a communication setup to facilitate collaboration between the second plurality of roles.

5. The system as in claim 4, wherein the transition cost further identifies an estimated period of time necessary for each of the second plurality of roles to reach the skill level necessary for each of the second plurality of roles to correspondingly perform one or more of the second plurality of tasks designated for each of the second plurality of roles.

6. The system as in claim 4, wherein the second organization design model is representative of the organization design state of the organization when the first organization design model is customized.

* * * * *